(12) United States Patent
Flachs et al.

(10) Patent No.: US 10,521,363 B2
(45) Date of Patent: Dec. 31, 2019

(54) FULLY-DIGITAL MULTIPLE PIN VALUE DETECTOR APPARATUS AND SAMPLING METHODS USEFUL IN CONJUNCTION THEREWITH

(71) Applicant: NUVOTON TECHNOLOGY CORPORATION, Hsinchu (TW)

(72) Inventors: Victor Flachs, Rlshon LeZion (IL); Yoel Hayon, Givatayim (IL)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 403 days.

(21) Appl. No.: 15/360,692

(22) Filed: Nov. 23, 2016

(65) Prior Publication Data
US 2018/0143917 A1  May 24, 2018

(51) Int. Cl.
  *G06F 3/00* (2006.01)
  *G06F 13/10* (2006.01)
  *G06F 13/20* (2006.01)

(52) U.S. Cl.
  CPC ............ *G06F 13/102* (2013.01); *G06F 13/20* (2013.01)

(58) Field of Classification Search
  CPC ......... G06F 13/102; G06F 13/20; G06F 13/00
  USPC ............ 710/16, 305–306, 313; 716/113, 134
  See application file for complete search history.

(56) References Cited

U.S. PATENT DOCUMENTS

| | | |
|---|---|---|
| 4,656,456 A | 4/1987 | Evans |
| 6,297,751 B1 | 10/2001 | Fadavi-Ardekani et al. |
| 2018/0067534 A1* | 3/2018 | Viviescas ............... H03K 17/22 |

* cited by examiner

*Primary Examiner* — Tim T Vo
*Assistant Examiner* — Kim T Huynh
(74) *Attorney, Agent, or Firm* — Oliff PLC (57) ABSTRACT

An Integrated circuit (IC) device accommodating a circuit and associated control module, being operative to determine an apparatus characteristic in accordance with one out of few selectable characteristics. The circuit is operative in conjunction with more than three of a plurality of external passive circuits corresponding to the plurality of apparatus characteristics, and includes ($N \geq 1$) digital I/O pins. The control module is operative to: (i) in response to a series of triggering signals, generate samples of the digital I/O pin's state that correspond to a plurality of different sequences of states when each of the plurality of external circuits is respectively applied to the pin and (ii) determining, from the samples, which of the plurality of different sequences of states has occurred that corresponds to the individual external circuit that has been applied to the pin; and (iii) determining an individual apparatus characteristic which corresponds to the determined sequence.

23 Claims, 4 Drawing Sheets

| Time (nominal.) | Step#. Action | Circuit 1 | Circuit 2 | Circuit 3 | Circuit 4 | Circuit 5 |
|---|---|---|---|---|---|---|
| 0 μs | 1. Drive pin low | Disc. $C_{PIN}$ | Chrg. C | Disc. C | Disc.$C_{PIN}$ | Disc. C |
| 10 μs | 2. Float pin | - | - | - | Chrg. $C_{PIN}$ | - |
| 20 μs | 3. Sample pin | SMP1 = 0 | SMP1 = 0 | SMP1 = 0 | SMP1 = 1 | SMP1 = 0 |
| | -- Wait | - | - | Chrg. C | - | |
| 220 μs | 4. Sample pin | SMP2 = 0 | SMP2 = 0 | SMP2 = 1 | SMP2 = 1 | SMP2 = 0 |
| 230 μs | 5. Drive pin high | Chrg. $C_{PIN}$ | Disc. C | Chrg. C | Chrg. $C_{PIN}$ | Chrg. C |
| 240 μs | 6. Float pin | Disc. $C_{PIN}$ | - | - | - | - |
| 250 μs | 7. Sample pin | SMP3 = 0 | SMP3 = 1 | SMP3 = 1 | SMP3 = 1 | SMP3 = 1 |
| | -- Wait | - | Chrg. C $V_{SS}$ | - | - | - |
| 450 μs | 8. Sample pin | SMP4 = 0 | SMP4 = 0 | SMP4 = 1 | SMP4 = 1 | SMP4 = 1 |
| | Unique Sequence | '0000' | '0010' | '0111' | '1111' | '0011' |
| | ADDR_SEL | '000' | '001' | '010' | '011' | '100' |

Fig. 4

FULLY-DIGITAL MULTIPLE PIN VALUE DETECTOR APPARATUS AND SAMPLING METHODS USEFUL IN CONJUNCTION THEREWITH

BACKGROUND

Strap pins are used for configuration setting extensively. Usually a strap pin is used for a 2 level setting (either 0 or 1, strapped low or strapped high). 3 levels straps are also used (strapped low, strapped high or left open). For a strap with more levels usually an analog to digital converter or a comparator is required. A resistor network supplies a pre-calculated voltage connected to an ADC input may be used to indicate one of many options. Conventional joystick tracking mechanisms identify the position of the joystick based on a known capacitor, and a resistor which varies according to the tilt of the stick. See for instance U.S. Pat. Nos. 6,297,751B1 and 4,656,456.

Typically, in joystick applications resistance is measured by generating a delay and focusing on the changes of the delay (relative to resistance), rather than on the delay itself.

SUMMARY OF THE INVENTION

There is a need in the art to provide for an apparatus enabling selection/determine of a plurality of chip configurations by applying external plural passive circuits respectively to at least one device digital I/O pin e.g. a single such pin on a chip. Note that "chip configuration" is a non-limiting example of "characteristics of a chip" or more generally "characteristics of an apparatus" of the invention. Thus, for example, in the case that the apparatus consists of a chip there may be chip characteristics other than chip configuration. Other non-limiting examples of characteristics of an apparatus may be, for example, a scenario of an apparatus that includes a board accommodating a chip (and possibly other chips), wherein the application of external plural passive circuits to the digital I/O pin of the chip will determine the board's version (e.g. manufacturing version) or type (e.g. out of few possible board types). The board type or version are another non limiting examples of characteristics of an apparatus of the invention. Note that the invention is not bound by these examples.

For simplicity of explanation, the description below will mainly refer to the non-limiting example of chip configuration.

Note also that in the description below the terms digital I/O pin may be referred occasionally for simplicity as digital-pin, strap-pin, I/O pin and pin.

In one embodiment, an internal circuit performs a subsequence 1, including operations I—iii below, and a subsequence 2, including operations iv—vi below; where subsequence 2 may either follow (as presented below) or alternatively precede subsequence 1:
  I. Drives low, floats the pin
  II. generates a Sample A after a predetermined time
  III. generates a Sample B after another predetermined time
  IV. Drives high, floats the pin
  V. generates a Sample C after a predetermined time
  VI. generates a Sample D after another predetermined time
The combination of the four samples A, B, C, D each comprising a binary digit, determines one of i>3 options depending on the external passive circuit that is applied to the pin and these options may then be used to select a configuration elsewhere on the chip.

In accordance with an aspect of the present invention, there is provided an apparatus comprising:
  at least one Integrated Circuit (IC) device accommodating an internal circuit and associated control module; the internal circuit and associated control module is operative to determine an apparatus characteristic in accordance with one out of a plurality of selectable apparatus characteristics, the internal circuit and associated control module being operative in conjunction with more than three (i>3) of a plurality of external passive circuits corresponding to the plurality of apparatus characteristics, and including:
  at least one (N≥1) digital I/O pin;
  the control module of the internal circuit being operative to:
    responsive to generating a series of pre-selected triggering signals, generate samples of the digital I/O pin's state that correspond to a plurality of different sequences of states when each of the plurality of external circuits is respectively applied to the pin;
    determining, from the samples, which of said plurality of different sequences of states has occurred that corresponds to the individual external circuit of the plurality of external circuits that has been applied to the pin; and determining an individual apparatus characteristic, from among the plurality of selectable characteristics, which corresponds to the determined sequence.

In accordance with an embodiment of the present invention, there is further provided an apparatus, including N>1 digital I/O pins and wherein the internal circuit and associated control module being operative in conjunction with i>3 external circuits applied to a given pin of the pins, and in conjunction with a respective number of external circuits each applied to a different and other of the given pin.

In accordance with an embodiment of the present invention, there is further provided an apparatus, including N>1 digital I/O pins and wherein the internal circuit and associated control module being operative in conjunction with different i>3 external circuits per each pin of said N pins, giving rise to $i^N$ different apparatus characteristics.

In accordance with an embodiment of the present invention, there is yet further provided an apparatus, wherein N=1 and the plurality of external circuits comprise more than 3 circuits.

In accordance with an embodiment of the present invention, there is yet further provided an apparatus, wherein the apparatus characteristic being IC device configurations.

In accordance with an embodiment of the present invention, there is yet further provided an apparatus, wherein the plurality of external circuits comprise a C circuit.

In accordance with an embodiment of the present invention, there is yet further provided an apparatus, wherein said C circuit includes a pull-down capacitor.

In accordance with an embodiment of the present invention, there is yet further provided an apparatus, wherein the C circuit includes a combination of connected capacitors.

In accordance with an embodiment of the present invention, there is yet further provided an apparatus, wherein the plurality of external circuits comprise an R circuit.

In accordance with an embodiment of the present invention, there is yet further provided an apparatus, wherein the R circuit includes a pull-down resistor.

In accordance with an embodiment of the present invention, there is yet further provided an apparatus, wherein the R circuit includes a pull-up resistor.

In accordance with an embodiment of the present invention, there is yet further provided an apparatus, wherein the R circuit includes a combination of connected resistors.

In accordance with an embodiment of the present invention, there is yet further provided an apparatus, wherein the plurality of external circuits comprise at least one RC circuit.

In accordance with an embodiment of the present invention, there is yet further provided an apparatus, wherein the at least one RC circuit includes a pull-down resistor and a pull-up capacitor.

In accordance with an embodiment of the present invention, there is yet further provided an apparatus, wherein the at least one RC circuit includes a pull-up resistor and a pull-down capacitor.

In accordance with an embodiment of the present invention, there is yet further provided an apparatus, wherein the RC circuit includes a combination of connected resistors and a combination of connected capacitors.

In accordance with an embodiment of the present invention, there is yet further provided an apparatus, wherein the plurality of external circuits comprise plural RC circuits.

In accordance with an embodiment of the present invention, there is yet further provided an apparatus, wherein the samples are generated at substantially pre-determined timings.

In accordance with an embodiment of the present invention, there is yet further provided an apparatus, wherein the generating a series of pre-selected triggering signals, generate samples of the digital I/O pin's state that correspond to a plurality of different sequences of states when each of the plurality of external circuits is respectively applied to the pin, include the following first subsequent (i) to (v) and then second subsequent (vi) to (ix):
  (i) drive the pin "low" for a predefined duration (tCAP);
  (ii) stop driving the pin and wait for a predefined duration (tPIN);
  (iii) sample and store the state of the pin at a register;
  (iv) wait another predefined period of time (tRC);
  (v) sample and store the state of the pin the register;
  (vi) drive the pin "high" for a predefined duration (tCAP);
  (vii) stop driving the pin and wait for a predefined duration (tPIN);
  (vii) sample and store the state of the pin at the register;
  (viii) wait another predefined period of time (tRC); and
  (ix) sample and store the state of the pin at the register.

In accordance with an embodiment of the present invention, there is yet further provided an apparatus, wherein the generating a series of pre-selected triggering signals, generate samples of the digital I/O pin's state that correspond to a plurality of different sequences of states when each of the plurality of external circuits is respectively applied to the pin, include the following second subsequent (vi) to (ix) and then first subsequent (i) to (v):
  (i) drive the pin "low" for a predefined duration (tCAP);
  (ii) stop driving the pin and wait for a predefined duration (tPIN);
  (iii) sample and store the state of the pin at a register;
  (iv) wait another predefined period of time (tRC);
  (v) sample and store the state of the pin the register;
  (vi) drive the pin "high" for a predefined duration (tCAP);
  (vii) stop driving the pin and wait for a predefined duration (tPIN);
  (vii) sample and store the state of the pin at the register;
  (viii) wait another predefined period of time (tRC); and
  (ix) sample and store the state of the pin at the register.

In accordance with an embodiment of the present invention, there is yet further provided an apparatus, wherein the samples correspond to the following sequences of states: '0000' indicative of a first pull-down R external circuit applied to the pin, '0010' indicative of a second RC external circuit applied to the pin, '0111' indicative of a third RC external circuit applied to the pin, '1111' indicative of a fourth pull-up resistor external circuit applied to the pin and '0011' indicative of a fifth C external circuit applied to the pin.

In accordance with an embodiment of the present invention, there is yet further provided an apparatus, wherein the samples correspond to the following sequences of states: '0000' indicative of a first pull-down R external circuit applied to the pin, '1000' indicative of a second RC external circuit applied to the pin, '1101' indicative of a third RC external circuit applied to the pin, '1111' indicative of a fourth pull-up resistor external circuit applied to the pin and '1100' indicative of a fifth C external circuit applied to the pin.

In accordance with an aspect of the present invention, there is yet further provided a method, comprising:
  (i) providing an apparatus that includes at least one Integrated Circuit (IC) device accommodating an internal circuit and associated control module, for determining an apparatus characteristic in accordance with one out of a plurality of selectable apparatus characteristics, the internal circuit and associated control module being operative in conjunction with more than three (i>3) of a plurality of external passive circuits corresponding to the plurality of apparatus characteristics, and including at least one (N≥1) digital I/O pin; the method further includes:
  (ii) responsive to generating a series of pre-selected triggering signals, generating samples of the digital I/O pin's state that correspond to a plurality of different sequences of states when each of the plurality of external circuits is respectively applied to the pin;
  (iii) determining, from the samples, which of the plurality of different sequences of states has occurred that corresponds to the individual external circuit of the plurality of external circuits that has been applied to the pin; and
  (iv) determining an individual apparatus characteristic, from among the plurality of selectable characteristics, which corresponds to the determined sequence.

DETAILED DESCRIPTION

A mechanism according to certain embodiments is now described which enables configuring an IC device for one out of several configurations (e.g. 4 or 5 or 6 or 7 or 8 or 9 or more). Note that the chip configuration may apply to the same chip of e.g. to one or more other chips accommodated within the same package of an apparatus of the invention.

The apparatus shown and described herein may utilize as little as a single device I/O pin, in conjunction with an internal circuit, operable in conjunction with an external passive circuit applied to the subject pin/s, samples the state of the pin through a predefined sequence of triggering signals, e.g. as shown herein, and decodes the resulting samples to select the one intended IC configuration from a plurality of possible configurations. Note that in accordance with certain embodiments the internal circuit may be composed of active components, and in certain embodiments the components may be digital.

The external passive circuits coupled with the subject pin may for example be one out of a plurality of possible R, C, or RC circuits to be applied by the system designer.

In accordance with certain embodiments, each of the five possible external passive circuits shown by way of example in FIG. 3 (and discussed in greater detail below) corresponds to a specific IC configuration which may be required.

The internal circuit may interact with the applied external circuit to determine which configuration is the one selected by the system designer, and, accordingly, indicates to the device configuration mechanisms which configuration to apply.

In accordance with certain embodiments, the mechanism operating and sampling the circuits uses a suitable clock signal. Assuming the (example) R/C values shown in FIG. 3, a frequency of 100 KHz may be used. Clock accuracy may be for example up to +/−10%. Note the presently disclosed subject matter is not bound by the utilization of a clock signal. Thus by way of non-limiting example the internal circuit may accommodate a separate delay circuitry for achieving the desired sampling operation. Timing considerations are further discussed below.

In accordance with certain embodiments, at least one of the following constraints may apply:
1. The capacitor value in the external circuit is much higher than pin and trace capacitance which may be, in accordance with certain embodiments, up to 20 pF.
2. The capacitor value should not be too high so that it cannot be charged within a short time—to reduce device initialization time. The acceptable time depends on the application, in some embodiments less than 1 ms is reasonable.
3. Resistor value is sufficiently high such that it does not limit the pin capability to charge the capacitor within a short time. Thus, in accordance with certain embodiments (pin can drive X mA) resistor value in Kohm of R>5*VCC/X.
4. Resistor is able to change the net level within a short time (until the first sample if there is no capacitor.

Note that these design considerations are provided by way of example only and may vary, depending upon the particular application. In a system that requires a shorter reset time, resistors of 2 Kohm and capacitors of 1 nF may be used. By tis example timing for samples is shortened to 1/50 of current values.

Figure 1:
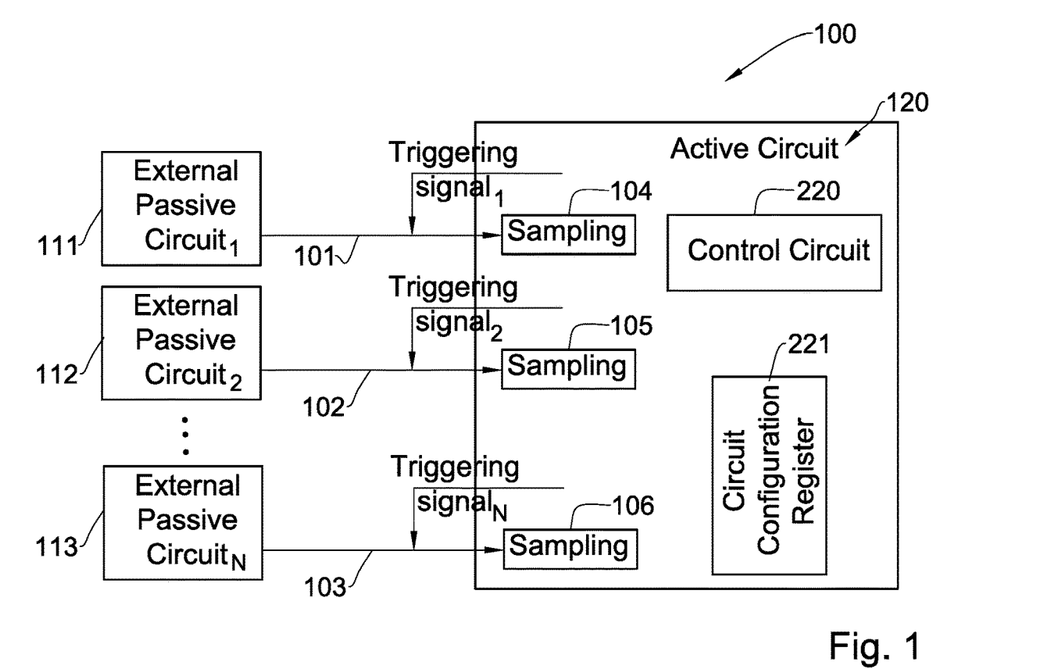
FIG. 1 is a generalized apparatus of a multiple pin internal circuit, for supporting a larger number of chip configurations, in accordance with certain embodiments of the invention.

Bearing this in mind, attention is drawn to FIG. 1 illustrating a generalized apparatus of multiple strap-pin internal) circuits for supporting a larger number of chip configurations, in accordance with certain embodiments of the invention.

The apparatus (e.g. IC chip 100) shown and described herein may utilize N>1 device I/O pins (of which pin "1" 101, pin "2" 102 and pin "N" 103 are shown) in conjunction with a circuit 120. While in FIG. 1 a single internal circuit is shown supporting the N pins, in accordance with certain embodiments other apparatus structures may apply, for instance a given internal circuit per pin, or in other words N circuits supporting corresponding N pins. For convenience, the description below with reference to FIG. 1 will refer to a single internal circuit.

Note and as specified above the apparatus of the invention may include for example a chip, plurality of chips (e.g. accommodated on a board) and so forth.

In accordance with certain embodiments, the internal circuit(s) operates during chip configuration phase, e.g. during device reset or shortly afterwards. Note that the invention is not bound by this operational phase.

The internal circuit 120 is operable in conjunction with an external passive circuit(s) which may be applied to the respective pins such that each external circuit may be connected to a corresponding pin. Thus, and as shown in FIG. 1, external circuit "1" (111) is connected to pin 101, external circuit "2" (112) is connected to pin 102 and external circuit "n" (113) is connected to pin 103. The external passive circuit that is connected to the corresponding pin may, for example, be one out of a plurality of possible R, C, or RC circuits to be applied by the system designer, all as will be explained in greater detail with reference to FIG. 3 below.

In accordance with certain embodiments, and assuming a single pin, each of i (i>3) possible external passive circuits corresponds to a specific IC chip configuration. In case of N>1) pins, a series of N circuits that are applied to the N pins give rise to a specific IC chip configuration, and accordingly $i^N$ IC chip configurations are supported. Considering the example of FIG. 3 (discussed in detail below) where five external circuits are utilized, each operable by being connected to a respective pin (from among the N pins), the total number of IC chip configurations that are being supported is $5^N$. Note that in accordance with certain embodiments, the number of passive circuits that may be connected to each pin is not necessarily the same. Thus, for instance, in the case of 2 pins (N=2) where four external circuits are connectable to the first pin and five to the second pin, the total number of chip configurations that may be supported is 20. The invention is not bound by these examples.

As will be explained in greater detail below, responsive to a sequence of pre-selected triggering signals that are applied to the external circuits through the respective pin, the pin states are sampled (for each pin e.g. 104, 105 and 106 in FIG. 1)). The samples correspond to different sequences of states (per pin) to determine (according to the relevant sequence) which one out of the i external circuits was applied to the pin, and consequently a given intended IC configuration (out of the i possible configurations) is selected. Considering that there are N pins, this yields $i^N$ possible configurations, allowing thus the IC device to operate in any of desired $i^N$ configurations depending upon the specific N external circuits that were applied to the N pins, as per the designer selection. The so determined sequences that stipulate the selected IC configuration may be stored e.g. in an appropriate storage device, such as a register.

The pertinent sequence of operations for determining the relevant IC configuration will be discussed in greater detail below.

Figure 2A:
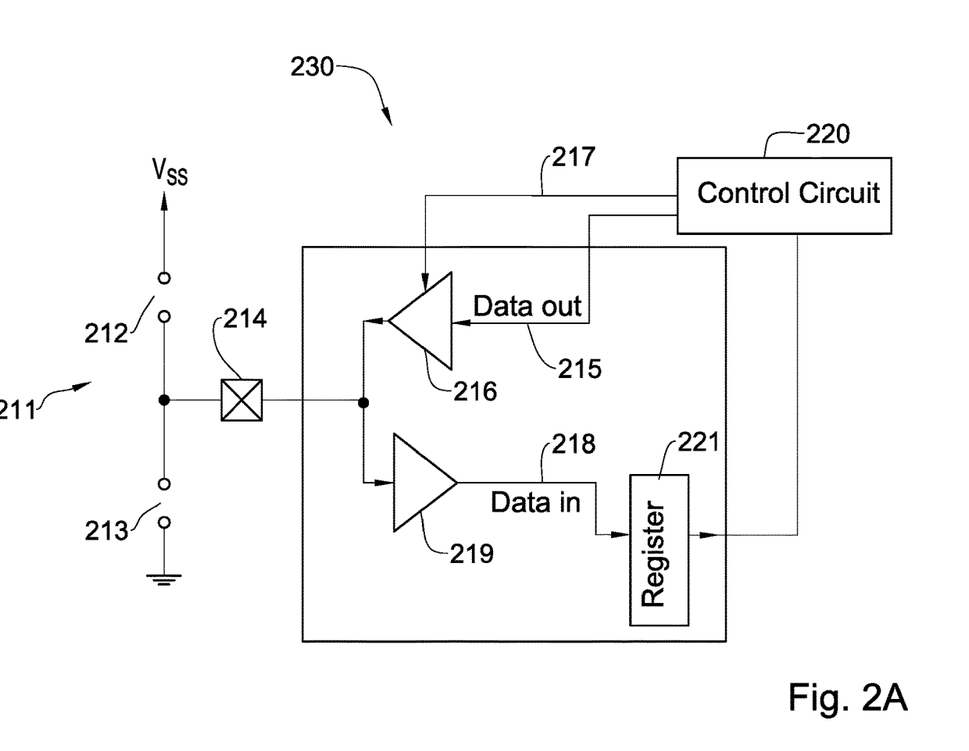
FIG. 2A is single pin partial internal circuit of an apparatus, for supporting some or all of five chip configurations, in accordance with certain embodiments of the presently disclosed subject matter.

Turning now to FIG. 2A, it illustrates schematically a single strap-pin partial internal circuit of an apparatus, operable to be connected to an external circuit (out of i>3 circuit configurations—and by this particular example five circuit configurations), in accordance with certain embodiments of the presently disclosed subject matter.

Figure 3:
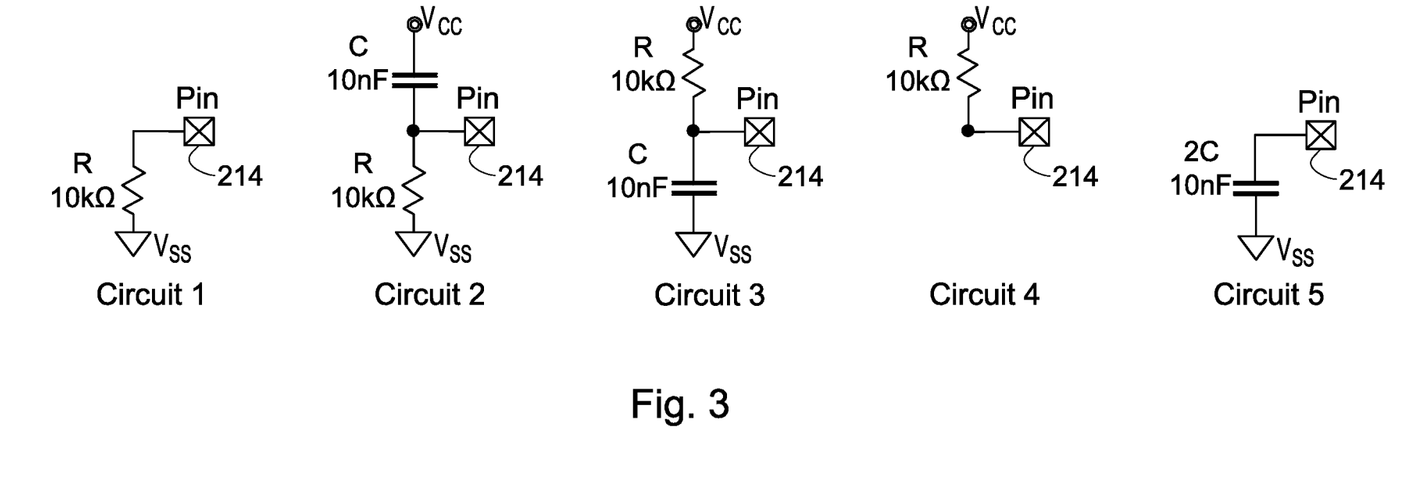
FIG. 3 is a diagram of five possible external passive circuits, some or all of which are to be applied to the strap pin of the circuit of FIG. 2A.

Thus, external circuit 211 which by this specific example may consist of five different combinations of C, R and RC may be connected at circuit locations 212, 213, giving rise to external circuit 211 that may be connected to pin 214, all as will be elaborated on with reference also to FIG. 3. A series of triggering signals stimuli are applied to the external circuitry 211 by enabling data output signals 215 to flow through (or be blocked by) buffer 216 (e.g. amplifier) in response to enable/disable signals fed to input 217 of buffer 216. These triggering signals will generate different samples at pin 214, depending upon the specific external passive circuit 211 (out of the i options) that is connected to the pin. These samples in their digital form are sampled at "data in" output 218 of buffer 219 yielding a unique sequence of say 4 bit samples that may be stored e.g. in 4 bit register 211 and are representative of a given IC configuration. The generation of the data out triggering signal enable/disable signals, and deduction of the IC configuration for the sequences of samples, may be implemented by, e.g. known per se control circuitry 220. One possible implementation of control module is through known per se state machine. The invention is not bound by this example. Note also that in accordance with certain embodiments, the "Data In" and "Data out" signals and buffers 216 and 219 are digital, whereas the triggering signals (e.g. at the output of buffer 216) and the sampled signal (e.g. at the input of buffer 219) are analog.

Note that the invention is not bound by the internal circuit structure of FIG. 2A and other known per se implementations may be used to achieve the same functionality.

Figure 2B:
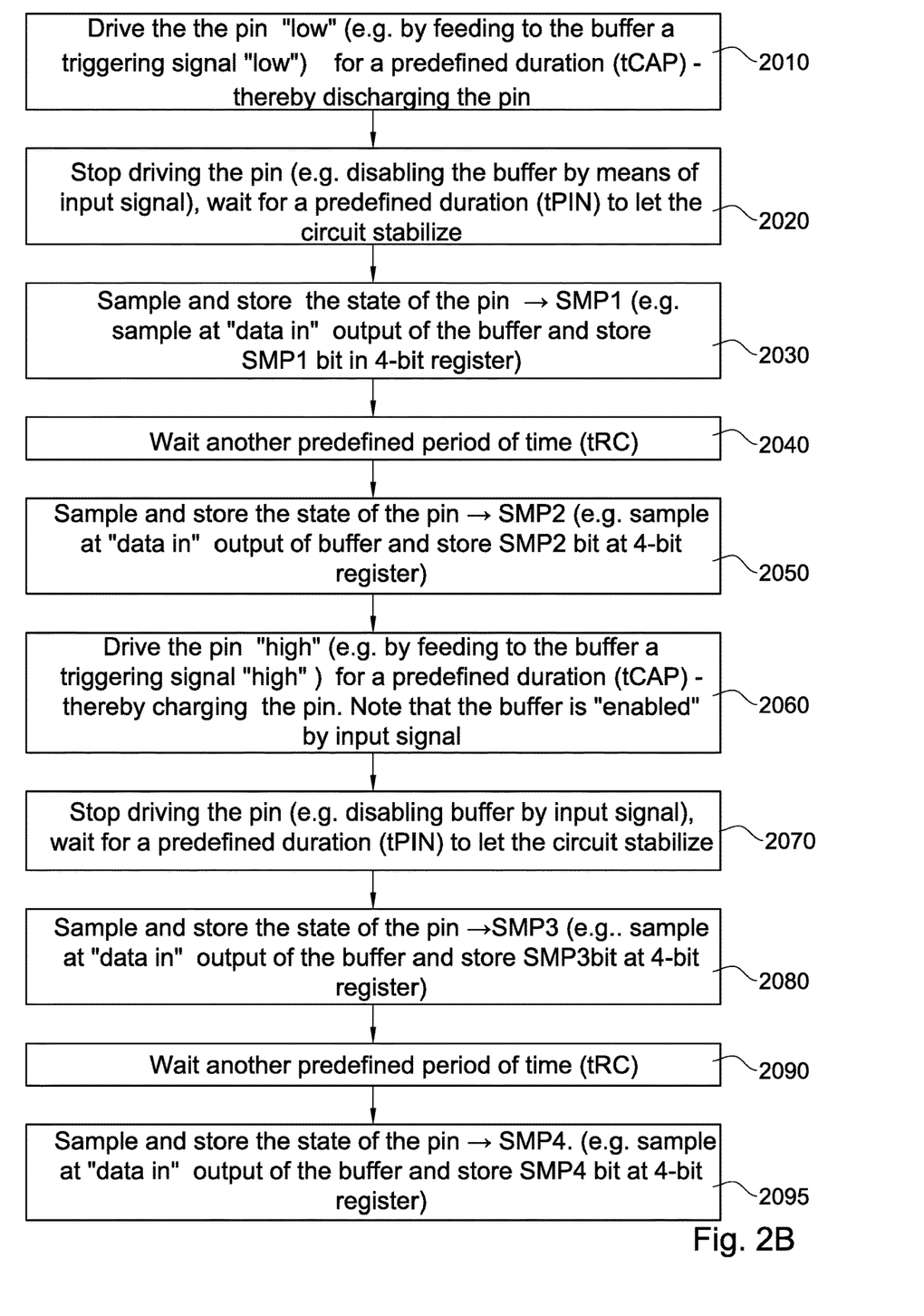
FIG. 2B is a generalized flow chart illustrating a sequence of operations of a circuit of an apparatus of FIG. 2A when external circuits are connected to the pin, according to certain embodiments of the invention.

Turning now to FIG. 2B, it illustrates a generalized flow chart of a sequence of operations of an internal circuit of FIG. 2A when external circuits are connected to the pin, according to certain embodiments of the invention.

Thus, utilization of the internal circuit 230 may include applying some or all of the following operations 2010-2095:
Subsequence 1:
2010 Drive the pin 214 "low" (e.g. by feeding to buffer 216 a triggering signal 215 "low") for a predefined duration (tCAP)—thereby discharging the pin. Note that buffer 216 may be "enabled" by input signal 217.
2020. Stop driving the pin 214 (e.g. disabling buffer 216 by means of input signal 217), wait for a predefined duration (tPIN) to let the circuit stabilize.
2030. Sample and store the state of the pin 214→SMP1 (e.g. sample at "data in" output of buffer 219 and store SMP1 bit at 4-bit register 221).
2040. Wait another predefined period of time (tRC).
2050. Sample and store the state of the pin→SMP2 (e.g. sample at "data in" output of buffer 219 and store SMP2 bit at 4-bit register 221).

Subsequence 2:
2060. Drive the pin 214 "high" (e.g. by feeding to buffer 216 a triggering signal 215 "high") for a predefined duration (tCAP)—thereby charging the pin. Note that buffer 216 may be "enabled" by input signal 217.
2070. Stop driving the pin 214 (e.g. disabling buffer 216 by input signal 217), wait for a predefined duration (tPIN) to let the circuit stabilize.
2080. Sample and store the state of the pin 214→SMP3 (e.g. sample at "data in" output of buffer 219 and store SMP3 bit at 4-bit register 221).
2090. Wait another predefined period of time (tRC).
2095. Sample and store the state of the pin→SMP4. (e.g. sample at "data in" output of buffer 219 and store SMP4 bit at 4-bit register 221).

It is appreciated that, alternatively, subsequence 2 may precede subsequence 1. The operations 2010-2095 as performed in certain embodiments, are described in further detail, below.

Note also that whereas the sequence of operations described with reference to FIG. 2B may be performed by control module 220 in conjunction with the various elements of the circuit 230, the invention is not bound by neither specific structure of control module 220 nor by any specific structure of the circuit structure which was provided in FIG. 2A for illustrative purposes only.

In accordance with certain embodiments, tCAP and tPIN can be selected according to the clock available at the time of configuration. In certain embodiments, a more accurate clock is available and at other times a less accurate clock is available. tCAP may depend on pin drive capability and C value. tPIN may depend on pin and trace capacitance and R value. In a specific non-limiting embodiment, both tCAP and tPIN are chosen to be less than one clock time (10 us).

It is noted that the teachings of the presently disclosed subject matter are not bound by the flow chart illustrated in FIG. 2B.

Attention is now drawn to FIG. 3 showing a diagram of five possible external passive circuits (aka Strap Pin Circuits—e.g. 211 of FIG. 2A) some or all of which may be applied to the strap pin (e.g. 214 of FIG. 2A).

Figure 4:
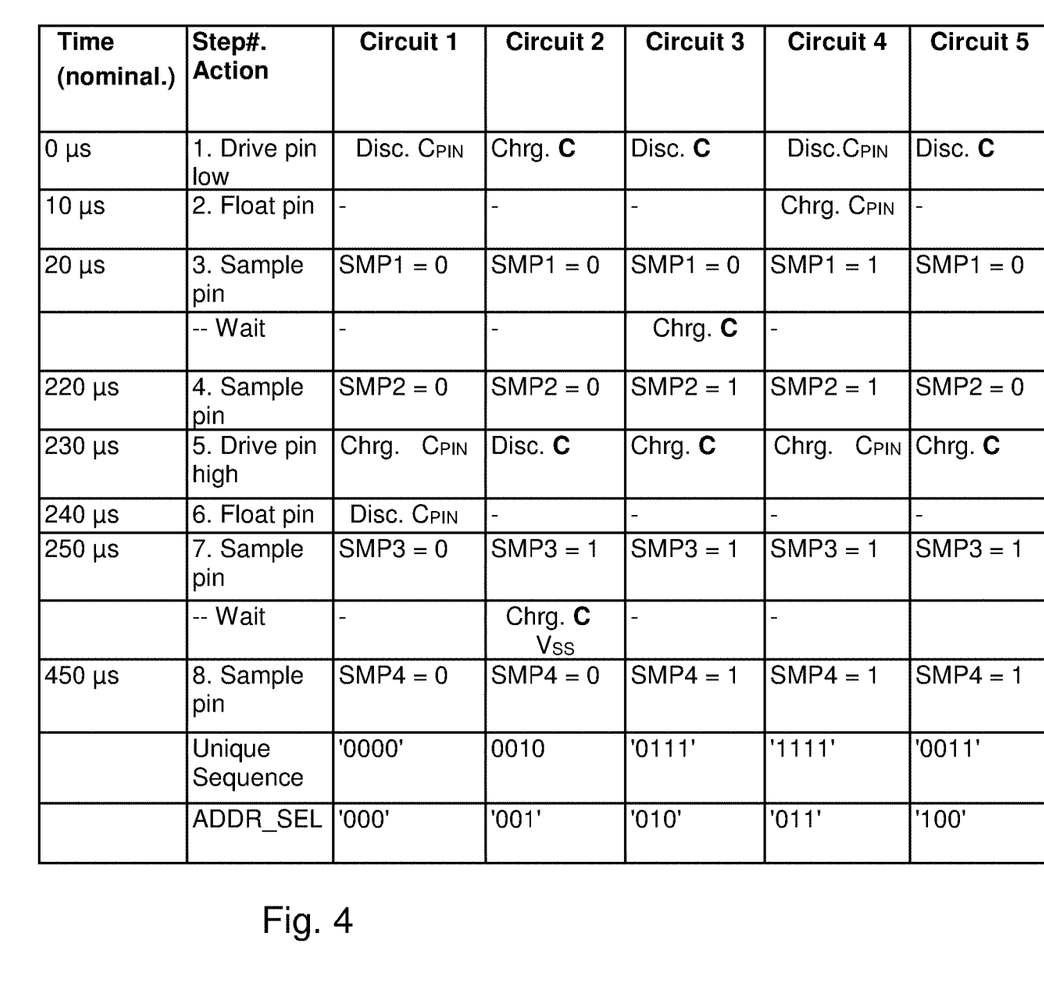
FIG. 4 is a table illustrating how to determine which of a plurality of different sequences of states has occurred, and determining, accordingly, which external circuit has been applied to the pin, some or all of which may be performed e.g. by the circuit herein, according to certain embodiments of the present invention.

Attention is also drawn to FIG. 4 showing a table illustrating how to determine which of a plurality of different sequences of states has occurred, and determine accordingly which external circuit has been applied to a circuit, some or all of which may be performed e.g. by the circuit, according to certain embodiments of the present invention.

Note that the description below will refer occasionally also to FIG. 2A and FIG. 2B, for clarity of explanation. As explained above, the invention is bound neither by the structure of the circuit 230, nor by the sequence of operations described with reference to FIG. 2B. Thus, for example, at least one of the elements depicted in FIG. 2A may be replaced by other elements and or different interlinked elements may be utilize for achieving the functionality of the circuit.

Note that the table illustrates the sequence of events through the above flow corresponding to each of the five circuit options shown in FIG. 3. The bottom row, ADDR_SEL, is one possible interpretation of the selected hardware configuration into a device address setting (as derived e.g. from the 4 bit sequence of states that may be stored in the 4 bit register 221 of FIG. 2A). Other possible interpretations depend on what the specific chip/device has to configure—possibly mode of operation: more test modes, pins in HiZ, operation clock frequency, etc.

As shown in the table of FIG. 4, the various steps (of FIG. 2B—under the control of, e.g. control circuit 220 of FIG. 2A) are outlined under the column "step#" of the table and the pertinent timing under the column "Time" of FIG. 4. All the specific values of the table of FIG. 4 are provided for illustrative purposes and are by no means binding.

Note also that there is a time constant of 100 us and a second sampling time of 210 us. The time constant may be approximately half of the second sampling time from the change point. In accordance with certain embodiments, the accuracy of the time constant may be for example up to ±25%.

Before moving on, and with reference to FIG. 3, one out of the five external circuits depicted in the Fig. (and designated generally as 211 in FIG. 2) may be applied to the strap pin (214 of FIG. 2A), thereby generating samples (in response to pre-selected triggering signals that are applied to the circuit) that correspond to a sequence of states being representative of an IC configuration which corresponds to the applied external circuit. The tolerance of the values of R (external circuits 1 and 4 of FIG. 3), RC (external circuits 2 and 3 of FIG. 3) and C (external circuit 5 of FIG. 3) may be for example up to +10%, or for example in other embodiments up to +25%.

The circuit that operates in conjunction with the external circuit may use a 100 KHz clock to generate its timing. The Strap Detection circuit's operation typically starts a few clock cycles after $V_{cc}$ Power-Up reset or Hardware reset. Power-Up reset or Hardware reset are examples of chip configuration phase during which the system and method of the presently disclosed subject matter may be applied.

Note that in FIG. 3, R-Circuit #1 depicts a "pull-down" resistor connected to pin 214 and $V_{SS}$ (ground), R-Circuit #4 depicted a "pull-up" resistor connected to pin 214 and to $V_{CC}$. RC-Circuits #2 depicts a capacitor connected to $V_{CC}$ and to pin 214, and a resistor connected to the pin 214 and $V_{SS}$ (ground), whereas RC-Circuits #3 depicts a resistor connected to $V_{CC}$ and to pin 214, and a capacitor connected to the pin 214 and $V_{SS}$ (ground). 2C circuit #5 depicts a capacitor connected to the pin 214 and to $V_{SS}$. Note that the invention is not bound by the specified circuit layouts. For instance, an equivalent circuit to circuits #2 and #3 are where the capacitor is connected parallel to the resistor, instead of in series, as depicted in FIG. 3. By way of a non-limiting example, an equivalent circuit to circuits #5 is with the capacitor connected to Vcc instead of to Vss. Those versed in the art will readily appreciate that other variants are applicable also in respect of the other circuits.

Note also that the description refers to $V_{CC}$, $V_{SS}$, (e.g. ground), zero voltage, LOW, HIGH. $V_{CC}$ may range for example between e.g. 1.7V to 3.3V, Zero (analog) refers to ground potential, LOW (digital) signifies "0" logic level, HIGH (digital) signifies "1" logic level, etc. The invention is by no means bound by these specific values. Note also that other known per se phenomena, such as parasitic capacitance, electrical effects due to current leakage etc. are ignored for simplicity of explanation.

Note also that the samples are generated at substantially pre-determined timings (e.g. 20, 220, 250 and 450μ sec). The invention is not bound by these numeric example.

Bearing all this in mind, attention is now drawn to the table of FIG. 4 (performed e.g. under the control of control circuit 220), describing the sequence of operations performed under the control of the control module, initially with reference to each one of the external passive C-circuits (circuit #2, #3 and #5 of FIG. 3) and later with reference to each one of the external passive R-circuits (circuits #1 and #4).

Thus, starting with the in 2010—see step #1 "Drive pin LOW": the pin 214 is driven to zero (e.g. by feeding to buffer 216 a triggering signal 215 "LOW") for $t_{CAP}$ time (by this example 10μ sec) which causes C, (e.g. at location 212 of Circuit 211—as in Circuit 2, of FIG. 3) to charge. In other words, in Circuit #2 voltage develops across the capacitor C with $V_{CC}$ at one end and zero at the other end (the pin). In contrast to Circuit #2, Driving pin 214 to zero will cause C, (e.g. at locations 213 of Circuit 211—as in any of Circuits #3 and #5 of FIG. 3) to discharge, i.e. the voltage is zero across the capacitor C with Vss at one end and zero at the other end.

In 2020, stop driving the pin—see step #2 "Float pin" (e.g. disable buffer 216 by means of input 217) and wait tPIN time (e.g. another 10μ sec—namely until 20μ sec). In any of Circuits 3 and 5 the capacitor is retained in discharge state and therefore the value at pin 214 is retained zero.

In case of Circuit 2, the capacitor is retained in charged state and therefore also here the value at pin 214 is low.

Accordingly, at 2030 (e.g. at time point 20μ sec)—see step #3 "Sample pin", the samples logic level of the pin 214 (sampled e.g. at output 218 of buffer 219) is in all cases LOW (see SMPL1=0 for circuits 2, 3 and 5) and stored e.g. as 1 bit in 4-bit register 221.

At 2040 (see "Wait" step in the table of FIG. 4), the control module waits $t_{RC}$ time (by this example for 200μ sec), for C to charge or discharge (depending on the capacitor connection e.g. in Circuits 2, 3 or 5 in FIG. 3). More specifically, in circuit #2 the voltage across the capacitor will discharge, namely current will flow through the RC circuit during the "wait" time interval resulting in zero voltage at pin 214 after the "wait" time interval has elapsed.

In circuit #3, the voltage across the resistor will entail flow of current that will charge the capacitor after the "wait" time interval has elapsed. In circuit #5 the 0 voltage across the capacitor (including pin 214) will be retained along the wait time interval.

Accordingly, in 2050 (e.g. at time point 220μ sec)—see step #4 "Sample pin", the samples logic level of the pin 214 (sampled e.g. at output 218 of buffer 219) is LOW (see SMPL2=0 for each one of circuits #2 and #5) but HIGH at circuit #3, i.e. SMPL2=1 (by virtue of the charged capacitor) and the respective sample (depending upon the circuit that is applied) is stored e.g. as 1 bit in 4-bit register 221.

Moving on to 2060—see step #5 "drive pin HIGH": the pin 214 is driven to Vcc, in our example 3.3V. (e.g. by feeding to buffer 216 a triggering signal 215 "HIGH") for $t_{CAP}$ time (by this example 10μ sec) which causes C, e.g. at location 212 of Circuit 211—as in Circuit 2, of FIG. 3) to discharge, i.e. with reference to Circuit #2 the voltage across the capacitor is zero with $V_{CC}$ at both ends. With reference to circuits, #3 and #5, driving pin 214 to HIGH will cause C, e.g. at locations 213 of Circuit 211—as in Circuits #3 and #5 of FIG. 3) to charge, i.e. voltage develops across the capacitor with $V_{SS}$ at one end and Vcc at the other end (pin 214).

At 2070, stop driving the pin—see step #6 "Float pin" (e.g. disable buffer 216 by means of input 217) and wait tPIN time (e.g. another 10μ sec—namely until 240μ sec). In any of Circuits #3 and #5 the capacitor is retained in its state and therefore the value at pin 214 is retained in all cases as Vcc. In the case of Circuit 2, the capacitor is retained in discharged state and therefore also here the value at pin 214 is Vcc.

Accordingly, at 2080 (e.g. at time point 250 sec)—see step #7 "Sample pin", the samples logic level of the pin 214 (sampled e.g. at output 218 of buffer 219) is in all cases HIGH (see SMPL3=1 for circuits 2, 3 and 5) and stored e.g. as 1 bit in 4-bit register 221.

At 2090 (see "Wait" step in the table of FIG. 4, the control module waits $t_{RC}$ time (by this example additional 200µ sec), for C to charge or discharge (depending on the capacitor connection e.g. in Circuits 2, 3 or 5 in FIG. 3). More specifically, in circuit #2 the voltage across the capacitor will discharge, namely current will flow through the RC circuit along the wait time interval resulting in zero voltage at pin 214 after the wait time interval has elapsed. In circuit #3, the capacitor will be retained in charged state after the wait time interval has elapsed, and the same holds true for the capacitor in circuit #5.

Accordingly, in 2095 (e.g. at time point 450µ sec)—see step #8 "Sample pin", the samples logic level of the pin 214 (sampled e.g. at output 218 of buffer 219) is LOW (see SMPL4=0 for circuits 2) but HIGH at any of circuits #3 and 5—SMPL4=1 (by virtue of the charged capacitor) and the respective sample is stored e.g. as 1 bit in 4-bit register 221.

The respective 4 bit samples (stored at register 221) are, thus, the sequence 0010 for Circuit #2, the sequence 0111 for circuit #3 and the sequence 0011 for Circuit #5.

The sequence of steps 2010-2095 will now be briefly discussed with reference to the R-Circuits #1 and #4.

Thus, in 2010—see step #1 "Drive pin LOW": the pin 214 is driven to zero (e.g. by feeding to buffer 216 a triggering signal 215 "LOW") for $t_{CAP}$ time (by this example 10µ sec) which entails zero voltage across the pull down resistor (connected in 213) in circuit #1 with $V_{SS}$ at one end and zero at the other end (the pin). Turning now to Circuit #4 a voltage is developed across the Pull up resistor (connected in 212) with $V_{CC}$ at one end and zero at the other end (pin 214), in both cases therefore the pin is discharged.

In 2020, stop driving the pin—see step #2 "Float pin" (e.g. disable buffer 216 by means of input 217) and wait tPIN time (e.g. another 10µ sec—namely until 20µ sec). In Circuit #1, the value is retained zero (pin 214—discharges), whereas in Circuit 4, the float pin will be pulled to Vcc by R and will rise to Vcc.

Accordingly, in 2030 (e.g. at time point 20µ sec)—see step #3 "Sample pin", the sampled logic level of the pin 214 (sampled e.g. at output 218 of buffer 219) is in the case of Circuit #1 LOW (see SMPL1=0 for Circuit #1), and in the case of Circuit #4 HIGH (see SMPL1=1 for Circuits #4). The 1 bit sample is stored e.g. as 1 bit in 4-bit register 221.

At 2040 (see "Wait" step in the table of FIG. 4) the control module waits $t_{RC}$ time (by this example for 200µ sec), which will not affect the state of the pin in respective Circuits #1 and #4 and accordingly, in 2050 (e.g. at time point 220µ sec)—see step #4 "Sample pin", the sampled logic level of the pin 214 will be retained as before, namely SMPL2=0 for Circuit #1, and SMPL2=1 for Circuit #4, and the respective sample is stored e.g. as 1 bit in 4-bit register 221.

Moving on to 2060—see step #5 "Drive pin HIGH": the pin 214 is driven to high (e.g. by feeding to buffer 216 a triggering signal 215 "HIGH") for $t_{CAP}$ time (by this example 10µ sec) which entails development of voltage across the pull-down resistor Circuit #1 with $V_{SS}$ at one end and Vcc at the other end, thereby charging pin 214. The Pull-up resistor in circuit #4 has 0V across it with $V_{CC}$ at one end and Vcc at the other end (pin 214).

At 2070, stop driving the pin—see step #6 "Float pin" (e.g. disable buffer 216 by means of input 217) and wait tPIN time (e.g. another 10µ sec—namely until 240µ sec). In Circuit 1, stop driving the HIGH, will result in zero at pin 214 (and $V_{SS}$ at the other end of the resistor)—pin 214 is discharged), whereas in Circuit 4, considering that the pin 214 is not connected to the ground it will be retained as charged at Vcc (no voltage across the pull-up resistor).

Accordingly, at 2080 (e.g. at time point 250µ sec)—see step #7 "Sample pin", the sampled logic level of the pin 214 (sampled e.g. at output 218 of buffer 219) is in the case of Circuit #1 LOW (see SMPL3=0 for Circuits #1), and in the case of Circuit #4 HIGH (see SMPL3=1 for Circuits #4). The 1 bit sample is stored e.g. as 1 bit in 4-bit register 221.

At 2090 (see "Wait" step in the table of FIG. 4) the control module waits $t_{RC}$ time (by this example for 200µ sec), which will not affect the state of the pin in the respective Circuits #1 and #4 and accordingly, in 2095 (e.g. at time point 450µ sec)—see step #8 "Sample pin", the sampled logic level of the pin 214 will be retained as before, namely SMPL4=0 for Circuits #1, and SMPL4=1 for Circuits #4, and the respective sample is stored e.g. as 1 bit in 4-bit register 221.

The respective 4 bit samples (stored at register 221) are, thus, the sequence 0000 for Circuit #1, and the sequence 1111 for circuit #4.

It is thus evident that a unique sequence is obtained for each passive external circuit that is applied to the pin (by the example of FIG. 3, five circuits), allowing thus to select any one of five different IC configurations of the chip.

It should be noted that the order of the Drive Pin LOW, float and wait (subsequence 1) and Drive pin HIGH, float and wait (subsequence 1) may be switched, namely steps 2060-2095 are invoked first, and thereafter steps 2010-2050 are invoked at a later stage, (all e.g. under the control of control module 220). This obviously will lead to different sequences where the sequence SAMPLE1 SAMPLE2, SAMPLE3 and SAMPLE4 will result in different unique sequence permutation SAMPLE3 SAMPLE4, SAMPLE1 and SAMPLE2, which, albeit are different to the first sequences, still maintain a unique sequence per applied external passive circuitry.

In accordance with certain embodiments, each of the passive circuits is simple, and includes only a few components, e.g. as shown. Alternatively, the circuits of FIG. 3 may include additional components e.g. additional resistors or capacitors. It is appreciated that the numerical properties of the resistors and capacitors denoted in FIG. 3 are merely by way of example. Those versed in the art will readily appreciate that design considerations may modify the structure of each of the external passive circuits. Thus, in accordance with certain embodiments, in circuit 2 or 3 of FIG. 3, the capacitor may be connected in parallel to the resistor, and will give the same result. In this case more places for components on the board may be required (4 components) than what was described in FIG. 3—2 components only. In accordance with certain embodiments, in circuit 5, the capacitor may be connected to VCC instead of to VSS for obtaining the same result. Note that other passive elements may be included e.g. inductor(s). Note also that two resistors may be connected in series or parallel for an equivalent circuit of one resistor, and same for capacitors.

It is appreciated that those circuits shown and described in FIG. 3 by way of example are not the only options for external circuits, some or all of which may be applied to the strap pin/s and others may be used alternatively or in addition.

There follows a description that pertains to timing considerations in accordance with certain embodiments. The invention is not bound by this example.

Assuming the following example values for external components: R=10 K'Ω, C=10 nF, 2C=10 nF), parameters may be as follows:

Required $t_{PIN}$>0.5 microsec (if $C_{PIN+R}$=20 pF—i.e., including PCB trace and resistor—t=10 K'Ω*20 pF=0.2 microsec),
thus reasonable time to rise or fall to a good digital level is 2 time constants, so 2 t=0.4 microsec<0.5 microsec $t_{CAP}$>10 microsec ($t_C$=(10 nF*3.3V)/16 mA=2 microsec; this takes into account an average pin drive current of 16 mA, capacitor value and Vcc=3.3V. $t_{2C}$=(10 nF*3.3V)/16 mA=2 microsec<10 microsec—to ensure the capacitor is fully charged/discharged).

$t_{RC}$>200 microsec (t=10 K'Ω*10 nF=100 microsec, thus 2 t=200 microsec—at 2 t the voltage is well within the input levels;
the charging/discharging of 2C during $t_{RC}$ is $V_{2c}$=(10 μA*200 microsec)/10 nF=200 mV<<$V_{II}$=0.3 $V_{CC}$, in this case, the following were assumed: input leakage $I_{LK}$=10 μA, $t_{RC}$=200 microsec.

As may be recalled from the description above with reference to FIG. 4, unique sequences were determined based on series of samples that were obtained in response to applying selected external circuits to the apparatus of the invention. These unique sequences are representative of specific chip configurations.

Figure 5:
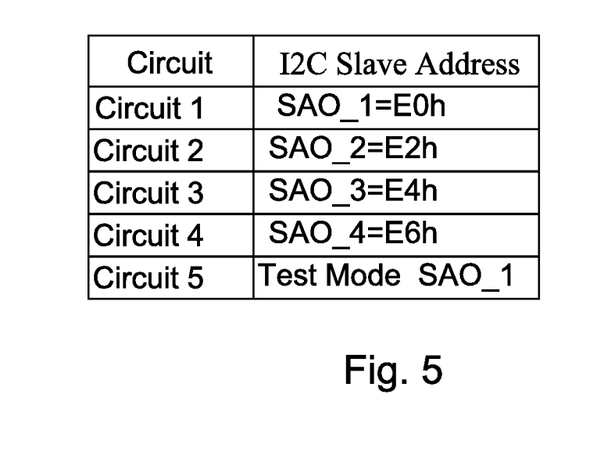
FIG. 5 illustrates a table representative of a Slave Address Selection table for Slave Address Selection in response to application of a given external circuit, according to certain embodiments of the present invention.

In this context, FIG. 5 illustrates a table representative of a Slave Address Selection table for Slave Address Selection in response to application of a given external circuit, according to certain embodiments of the present invention.

After detecting the circuit connected to the strap pin, control module may convert the value of the bits sequence to the corresponding value of the slave address.

Thus, when one of these external circuits is connected to the pin (214), I²C Slave addresses (or Test Mode) are selected e.g. as per the table of FIG. 5.

The I²C Slave addresses (and Test mode) are examples that represent different IC configurations.

Note that in accordance with certain embodiments, the utilization of simple passive circuits operating at fixed time intervals (of providing triggering signals and sampling the resulting digital samples) for determining a plurality of possible chip configurations (in a scalable manner, in case of using more than one pin) constitutes an advantage, in the sense of providing a simple, reliable and non-error prone solution of utilizing external circuits for determining chip configuration as per a designer selection.

In the description above, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Note that the terms chip and Integrated Circuit (IC) device are used interchangeably.

As will be further detailed with reference to FIGS. 1-4, the control circuit can be implemented in hardware/software/firmware and in case of software configured to execute several functional modules in accordance with computer-readable instructions implemented on a non-transitory computer-readable storage medium.

It is noted that the teachings of the presently disclosed subject matter are not bound by the apparatus described with reference to FIG. 1 and/or circuit of FIG. 2A. Equivalent and/or modified functionality can be consolidated or divided in another manner and can be implemented in any appropriate combination of software with firmware and/or hardware and executed on a suitable device.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. An apparatus comprising:
at least one Integrated Circuit (IC) device having at least one (N≥1) digital I/O pin and accommodating an internal circuit and associated control module; the internal circuit and associated control module is operative to determine an apparatus characteristic in accordance with one out of a plurality of selectable apparatus characteristics, the internal circuit and associated control module being operative in conjunction with more than three (i>3) of a plurality of external passive circuits corresponding to said plurality of apparatus characteristics, and including:
the control module of said internal circuit being operative to perform:
generating a series of pre-selected triggering signals that is driven through at least one (N≥1) of said digital I/O pins to each of a plurality of external circuits:
sampling of generated states of the at least one of said digital I/O pins that correspond to a plurality of different sequences of states when each of said plurality of external circuits is respectively applied to the pin;
determining, from said samples, which of said plurality of different sequences of states has occurred that corresponds to the individual external circuit of said plurality of external circuits that has been applied to the pin; and
determining an individual apparatus characteristic, from among the plurality of selectable characteristics, which corresponds to said determined sequence.

2. The apparatus according to claim 1, including N>1 digital I/O pins and wherein the internal circuit and associated control module being operative in conjunction with i>3 external circuits applied to a given pin of said pins, and in conjunction with a respective number of external circuits each applied to a different and other of said given pin.

3. The apparatus according to claim 2, including N>1 digital I/O pins and wherein the internal circuit and associated control module being operative in conjunction with different i>3 external circuits per each pin of said N pins, giving rise to iN different apparatus characteristics.

4. The apparatus according to claim 1, wherein N=1 and said plurality of external circuits comprise more than 3 circuits.

5. The apparatus according to claim 1, wherein said apparatus characteristic being IC device configurations.

6. The apparatus according to claim 1, wherein said plurality of external circuits comprise a C circuit.

7. The apparatus according to claim 6, wherein said C circuit includes a pull-down capacitor.

8. The apparatus according to claim 6, wherein said C circuit includes a combination of connected capacitors.

9. The apparatus according to claim 1, wherein said plurality of external circuits comprise an R circuit.

10. The apparatus according to claim 9, wherein said R circuit includes a pull-down resistor.

11. The apparatus according to claim 9, wherein said R circuit includes a pull-up resistor.

12. The apparatus according to claim 9, wherein said R circuit includes a combination of connected resistors.

13. The apparatus according to claim 1, wherein said plurality of external circuits comprise at least one RC circuit.

14. The apparatus according to claim 13, wherein said at least one RC circuit includes a pull-down resistor and a pull-up capacitor.

15. The apparatus according to claim 13, wherein said at least one RC circuit includes a pull-up resistor and a pull-down capacitor.

16. The apparatus according to claim 13, wherein said RC circuit includes a combination of connected resistors and a combination of connected capacitors.

17. The apparatus according to claim 13, wherein said plurality of external circuits comprise plural RC circuits.

18. The apparatus according to claim 1, wherein said samples are generated at substantially pre-determined timings.

19. The apparatus according to claim 1, wherein said generating and sampling steps, include the following first subsequent (i) to (v) and then second subsequent (vi) to (ix):
(i) drive the pin "low" for a predefined duration (tCAP);
(ii) stop driving the pin and wait for a predefined duration (tPIN);
(iii) sample and store the state of the pin at a register;
(iv) wait another predefined period of time (tRC);
(v) sample and store the state of the pin the register;
(vi) drive the pin "high" for a predefined duration (tCAP);
(vii) stop driving the pin and wait for a predefined duration (tPIN);
(vii) sample and store the state of the pin at the register;
(viii) wait another predefined period of time (tRC); and
(ix) sample and store the state of the pin at the register.

20. The apparatus according to claim 1, wherein said generating and sampling steps include the following second subsequent (vi) to (ix) and then first subsequent (i) to (v):
(i) drive the pin "low" for a predefined duration (tCAP);
(ii) stop driving the pin and wait for a predefined duration (tPIN);
(iii) sample and store the state of the pin at a register;
(iv) wait another predefined period of time (tRC);
(v) sample and store the state of the pin the register;
(vi) drive the pin "high" for a predefined duration (tCAP);
(vii) stop driving the pin and wait for a predefined duration (tPIN);
(vii) sample and store the state of the pin at the register;
(viii) wait another predefined period of time (tRC); and
(ix) sample and store the state of the pin at the register.

21. The apparatus according to claim 18, wherein said samples correspond to the following sequences of states: '0000' indicative of a first pull-down R external circuit applied to said pin, '0010' indicative of a second RC external circuit applied to said pin, '0111' indicative of a third RC external circuit applied to said pin, '1111' indicative of a fourth pull-up resistor external circuit applied to said pin and '0011' indicative of a fifth C external circuit applied to said pin.

22. The apparatus according to claim 20, wherein said samples correspond to the following sequences of states: '0000' indicative of a first pull-down R external circuit applied to said pin, '1000' indicative of a second RC external circuit applied to said pin, '1101' indicative of a third RC external circuit applied to said pin, '1111' indicative of a fourth pull-up resistor external circuit applied to said pin and '1100' indicative of a fifth C external circuit applied to said pin.

23. A method, comprising:
(i) providing an apparatus that includes at least one Integrated Circuit (IC) device having at least one (N≥1) digital I/O pin and accommodating an internal circuit and associated control module, for determining an apparatus characteristic in accordance with one out of a plurality of selectable apparatus characteristics, the internal circuit and associated control module being operative in conjunction with more than three (i>3) of a plurality of external passive circuits corresponding to said plurality of apparatus characteristics,
the method further includes:
(i) generating a series of pre-selected triggering signals that is driven through at least one (N≥1) of said digital I/O pins to each of a plurality of external circuits;
(ii) sampling of generated states of the at least one of said digital I/O pins that correspond to a plurality of different sequences of states when each of said plurality of external circuits is respectively applied to the pin;
(iii) determining, from said samples, which of said plurality of different sequences of states has occurred that corresponds to the individual external circuit of said plurality of external circuits that has been applied to the pin; and
(iv) determining an individual apparatus characteristic, from among the plurality of selectable characteristics, which corresponds to said determined sequence.

* * * * *